United States Patent [19]

Harvey

[11] Patent Number: 4,616,437
[45] Date of Patent: Oct. 14, 1986

[54] FISHING APPARATUS AND INDICATING DEVICE

[76] Inventor: Marvin R. Harvey, P.O. Box 1048, Riverton, Wyo. 82501

[21] Appl. No.: 660,121

[22] Filed: Oct. 12, 1984

[51] Int. Cl.⁴ ............................................. A01K 97/12
[52] U.S. Cl. .......................................................... 43/17
[58] Field of Search ..................... 43/17, 15, 16, 21.2; 248/529, 533, 519

[56] References Cited

U.S. PATENT DOCUMENTS

| | | | |
|---|---|---|---|
| 1,406,038 | 2/1922 | Larsen | 43/17 |
| 2,136,864 | 11/1938 | Paquette | 43/17 |
| 2,430,840 | 11/1947 | Westfall | 248/529 |
| 2,554,927 | 5/1951 | Schultz | 43/16 |
| 2,693,046 | 11/1954 | Langevin | 43/17 |
| 2,732,543 | 1/1956 | Mogren | 43/17 |
| 2,799,962 | 7/1957 | Mogren | 43/17 |
| 2,816,388 | 12/1957 | Hartley | 43/17 |
| 2,999,328 | 9/1961 | Revord | 43/17 |
| 3,387,401 | 6/1968 | Stelmach | 43/17 |
| 3,470,647 | 10/1969 | Horner | 43/17 |
| 3,879,880 | 4/1975 | Bailey | 43/17 |
| 3,913,255 | 10/1975 | Fillman | 43/17 |
| 4,051,616 | 10/1977 | Mathauser | 43/17 |

*Primary Examiner*—Gene P. Crosby
*Attorney, Agent, or Firm*—Worrel & Worrel

[57] ABSTRACT

A fishing apparatus particularly well suited for ice fishing including a housing mounting a fishing reel which deploys a fishing line. Legs are releasably mounted on the housing to support the housing in an operational attitude. An indicating assembly is mounted on the housing for pivotal movement from a ready position to an indicating position upon movement of the fishing reel to indicate that a fish has struck the fishing line.

18 Claims, 6 Drawing Figures

FISHING APPARATUS AND INDICATING DEVICE

BACKGROUND OF THE INVENTION

1. Field of The Invention

The present invention relates to a fishing apparatus having particular utility in ice fishing and to an indicating device for registering a change in the condition of a work object and which is unusually well suited to indicating when a fish has contacted the line of a fishing apparatus evidencing such an occurrence through a variety of selectively determinable signals.

2. Description Of The Prior Art

The prior art is replete with devices of various types adapted to signal when a fish has been snagged on the line of a fishing pole. Some such devices have been specifically designed for such usage in connection with ice fishing. Typically, however, such devices are both cumbersome to set up and operate and are less than dependable in operation. For example, in some such devices triggering of an alarm is dependent upon the closing of a switch by a rather clumsy assembly of levers or linkages which are subject to inadvertent damage or improper adjustment. Without closure of the switch, the alarm will not be operated.

Similarly, prior art alarm devices do not provide the operator with the option of selecting the best alarm for the conditions at hand. Thus, a signal light may be appropriate for night fishing or at dawn or dusk while it would be of little value during daylight hours. Conversely, a signal horn may not be best suited to use at night.

Still further, there are problems peculiar to ice fishing. Conventional ice fishing devices are rather cumbersome and cannot conveniently nor securely be stored for transport. They are thus subject to damage. In addition, alarm devices, including those specifically adapted for ice fishing, have proved unreliable and inconvenient to set up, operate and then to disassemble and store.

Therefore, it has long been known that it would be desirable to have a fishing apparatus particularly adapted for ice fishing which can conveniently be set up and operated while having the capability of being rapidly disassembled and disposed in a transport configuration which minimizes the risk of damage to the components thereof. Similarly, it has also been known that it would be desirable to have an indicating device particularly well suited to use on ice fishing devices which is compact and dependable in operation, which permits the operator to select the type of signal most suited to the circumstances and which is adapted for convenient and secure storage so as virtually to preclude damage thereto.

SUMMARY OF THE INVENTION

Therefore, it is an object of the present invention to provide an improved fishing apparatus and indicating device, both particularly well suited to use in ice fishing.

Another object is to provide such a fishing apparatus and indicating device which cooperate both in deployed configurations as well as in stored configurations to perform their respective functions.

Another object is to provide such a fishing apparatus which can conveniently be erected and dependably operated while possessing the capability of rapidly being disassembled and placed in a transport configuration adapted to protect the operative components thereof.

Another object is to provide such an indicating device which operates dependably to signal the operator without having to depend on complicated linkages and switch connections susceptible to malfunction.

Another object is to provide such an indicating device which allows the operator to select the type of signal most appropriate to the particular environmental conditions encountered during use.

Further objects and advantages are to provide improved elements and arrangements thereof in an appratus for the purposes described which is dependable, economical, durable and fully effective in accomplishing its intended purposes.

DESCRIPTION OF THE PREFERRED EMBODIMENT

Figure 1:
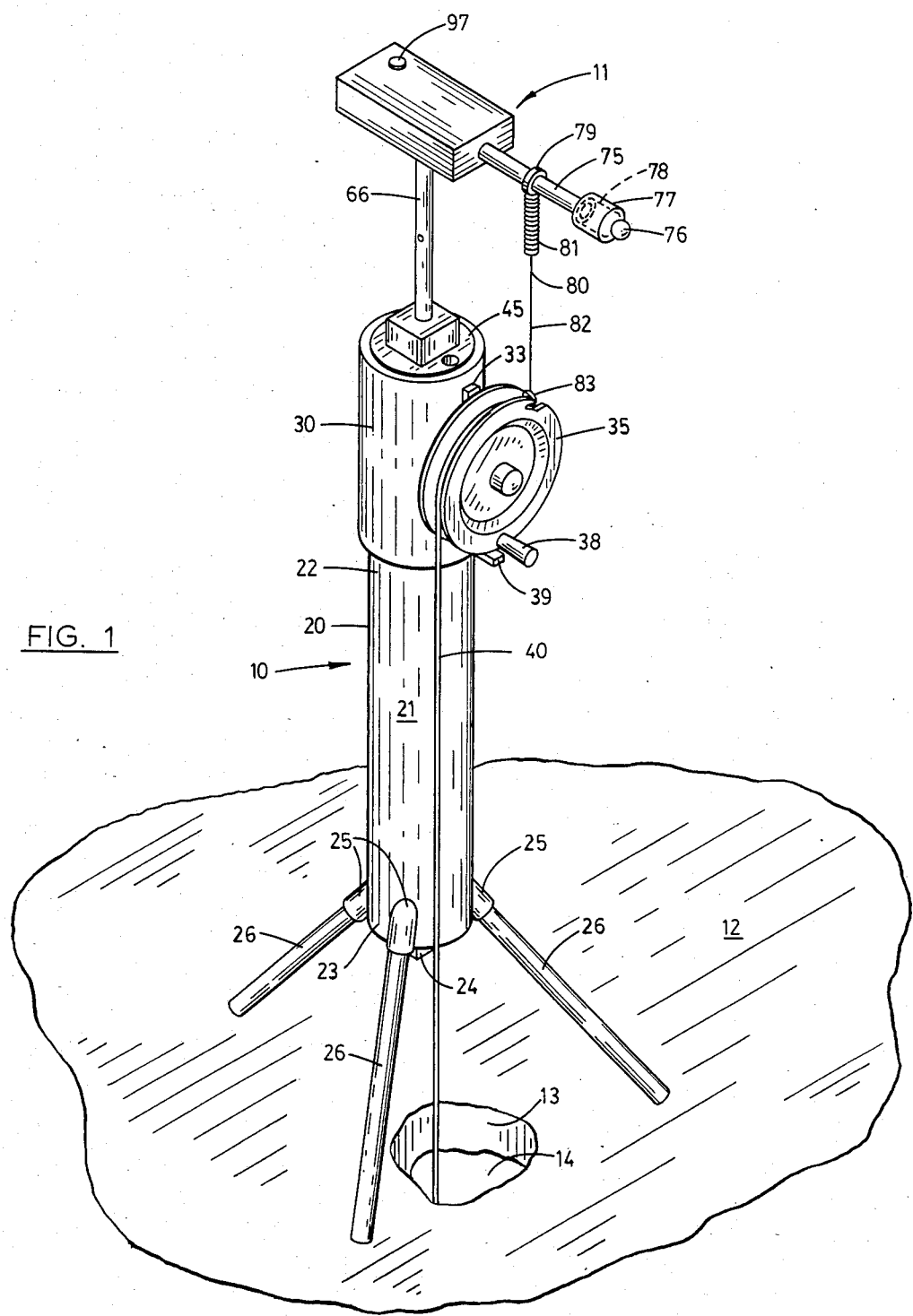
FIG. 1 is a perspective view of the fishing apparatus and indicating device of the present invention shown in a typical operative environment with the indicating device retained in a ready position.

Referring more particularly to the drawings, the fishing apparatus of the present invention is generally indicated by the numeral 10 in FIG. 1 and the indicating device hereof by numeral 11 in FIG. 1. Also shown for illustrative convenience in FIG. 1, ice such as that of a frozen lake is indicated at 12 through which a hole 13 has been formed to gain access to the water 14 beneath the ice.

The fishing apparatus 10 has a tubular housing 20 preferably constructed of a synthetic plastic material such as polyvinyl chloride. The tubular housing includes a lower cylinder 21 having an upper end portion 22 and an opposite lower end portion 23. An end wall 24 is mounted on and seals the lower end portion 23 of the lower cylinder. Three leg mounts or sleeves 25 are mounted on the lower end portion of the lower cylinder in spaced relation thereabout and oriented so as to face in corresponding angles obliquely with respect to the lower cylinder, as can best be visualized in FIG. 1. Legs 26 are individually slidably and thus removably received in the leg mounts in such a manner that the tubular housing can be supported in upright relation by the legs, as shown in FIG. 1, rested on a supporting surface such as the ice 12.

Figure 6:
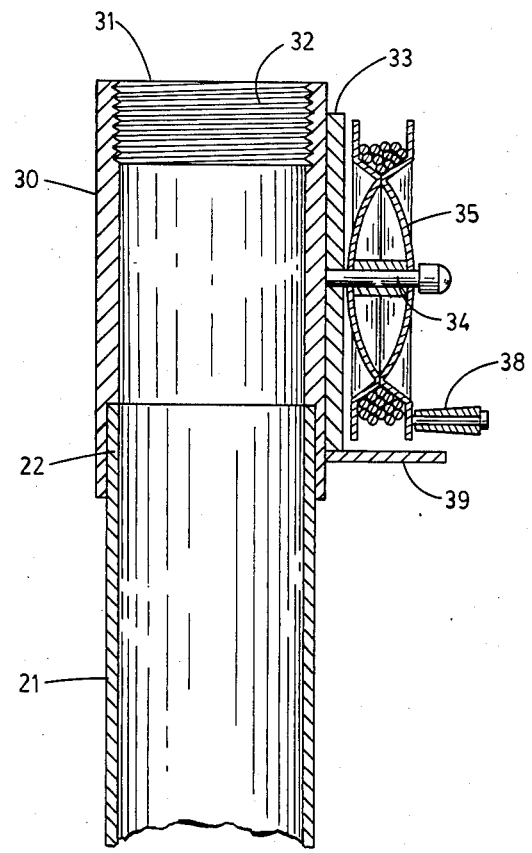
FIG. 6 is a somewhat enlarged, fragmentary longitudinal section taken from a position indicated by line 6—6 in FIG. 4.

The tubular housing 20 has an upper cylinder 30 secured on the upper end portion 22 of the lower cylinder 21 as best shown in FIG. 6. The upper cylinder has a cylindrical mouth 31 in which are formed internal screw threads 32.

A reel mount 33 is affixed on the external surface of the upper cylinder 30, as best shown in FIG. 6. A spindle 34 is mounted on the reel mount extending outwardly therefrom substantially normal to the longitudinal axis of the upper cylinder. A reel 35 is rotationally mounted on the spindle for rotation thereabout. The reel has a notch 36 therein so shaped as to define a protrusion 37, as can best be seen in FIGS. 1 and 4. A handle 38 is mounted on the reel for rotation of the reel about the spindle. A confining plate 39 is affixed on the reel mount 33 in close association with the periphery of the reel for confining the fishing line 40 which is wound about the reel in the conventional fashion.

The fishing apparatus 10 includes a closure 45 having external screw threads 46 and dimensioned screw threadably to be received in the internal screw threads 32 of the mouth 31 of the upper cylinder 30. The closure has a first surface 47 and an opposite second surface 48. A first receptacle or hole 49 is formed in the first surface 47 substantially centrally thereof and is of predetermined dimensions for purposes hereinafter to be set forth. A second receptacle of a rectangular configuration is provided in the second surface of the closure and is also of predetermined dimensions for purposes hereinafter to be set forth. A lateral passage 51 extends through the closure interconnecting the first and second surfaces thereof and is laterally disposed with respect to the first and second receptacles, as can best be seen in FIG. 5.

As noted, the closure 45 is adapted screw threadably to be received in the mouth of the upper cylinder 30. To facilitate such attachment and removal, the first surface 47 of the closure is formed so as to provide a grasping head 52 in which the hole 49 is disposed. The grasping head can be grasped by hand for purposes of such insertion or removal of the closure or is so dimensioned as to permit a wrench to be employed if desired.

The indicating device 11 has as indicating assembly or box-like housing 60 of a substantially rectangular configuration having a lower end portion 61 dimensioned for slidable receipt in the second receptacle 50 of the closure 45 and an opposite upper end portion 62. The housing 60 has a substantially flat back surface 63 and an opposite front surface 64. A rod 65 is mounted on the back surface 63 of the housing 60 extending outwardly therefrom adjacent to the upper end portion 62 thereof. An elongated support 66 is pivotally mounted on pivotal connection 67 interconnecting the rod and the support for pivotal movement of the support about an axis substantially transverse to the longitudinal axis of the housing. The indicating assembly is so weighted that when it is positioned in the ready position shown in FIG. 1, but released for pivotal movement about pivotal connection 67, it pivots gravitationally to the indicating or signaling position shown in FIG. 2.

A hole 68 is transversely extended through the support remote from the pivotal connection 67 and dimensioned to receive a locking pin 69. The support has a remote end portion 70 dimensioned and adapted for removable receipt in the hole 49 of the closure 45.

Figure 2:
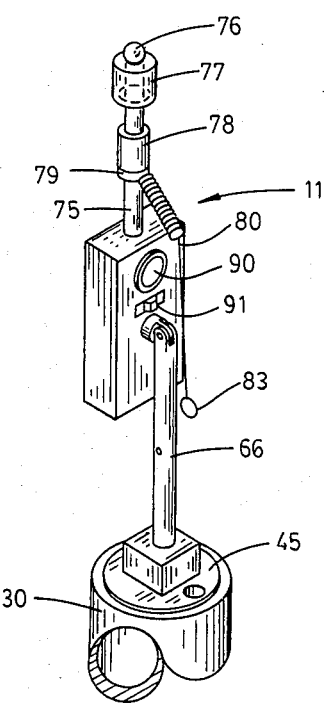
FIG. 2 is a fragmentary perspective view of the fishing appratus and indicating device of FIG. 1 showing the indicating device disposed in an indicating position.

A hollow arm, track or tube 75 is mounted on the upper end portion 62 of the housing 60, as best shown in FIGS. 1 and 2. The tube has a signal light 76 at the remote end thereof and a substantially cylindrical enclosure 77 extending from the signal light about the tube and in spaced substantially concentric relation thereto. A signal member 78, preferably of a bright, fluorescent or highly visible color, is slidably received on the tube for movement therealong and is dimensioned so as to be positionable on the tube fully concealed within the enclosure 77. A stop ring 79 is mounted on the rod spaced from the enclosure a distance of approximately the length of the signal member. The stop ring is dimensioned so as to be engagable by the signal member to prevent movement therebeyond in the direction of the housing.

A release member 80 is fastened on the stop ring 79 and includes a tension spring portion 81 connected to a line 82 having a ring 83 at the remote end thereof.

Figure 3:
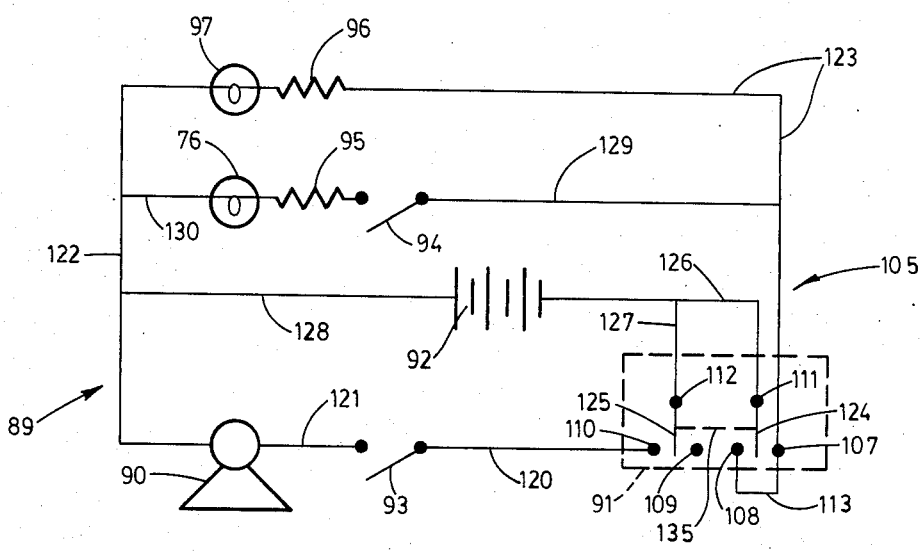
FIG. 3 is a schematic diagram of the electrical system of the indicating device.

Referring more particularly to FIGS. 1, 2 and 3, the indicating device has an electrical system 89 including a signal horn 90, preferably mounted in the housing 60 and communicating with the exterior thereof through the back surface 63 of the housing. Similarly, a double pole, double throw, three position or on-off-on switch 91 is mounted on the housing preferably extending from the back surface 63 of the housing, as can best be seen in FIG. 2. Mounted within the housing is a suitable battery 92 and first and second mercury switches 93 and 94 respectively. The mercury switches are oriented within the housing so as to close under the force of gravity when the housing is moved to the position shown in FIG. 2. A first resistor 95 is mounted in the housing operatively interconnecting the second mercury switch 94 and the signal light 76. A second resistor 96 operatively connected to a light emitting diode 97 which is also mounted on the housing and communicates with the front surface 64 to be visible thereon.

The electrical system 89 further includes an electrical circuit 105 shown diagrammatically in FIG. 3. Referring in more detail to the switch 91, it will be seen, as shown in FIG. 3, that the switch is a three position switch having switch contacts 107, 108, 109 and 110. The switch contacts define three positions such that, as viewed in FIG. 3, switch contacts 110 and 108 define a first switch position and switch contacts 109 and 107 define a third switch position. The first and third switch positions are "on" positions, as will hereinafter be described in greater detail. A second switch position between the first and third switch positions is shown in FIG. 3 wherein no electrically conductive contact is made through the switch. The second switch position is thus an "off" position. The switch 91 also has switch housing connections 111 and 112. Electrical conductor 113 interconnects switch contacts 107 and 108.

The electrical circuit 105 includes electrical conductor 120 operatively interconnecting switch contact 110 and the first mercury switch 93. Electrical conductor 121 operatively interconnects the first mercury switch 93 and the signal horn 90. Electrical conductor 122 operatively interconnects the signal horn 90 and the light emitting diode 97 to battery. Electrical conductor 123 operatively interconnects the second resistor 96 and the switch contact 107. Electrical conductor 124 is operatively connected to switch housing connection 111 and is extended for contact with either of the switch contacts 107 or 108. Electrical conductor 125 is operably connected to switch housing connection 112 and is extended for contact with either of the switch contacts 109 and 110.

Electrical conductor 126 operatively interconnects switch housing connection 111 and the battery 92. Electrical conductor 128 operatively interconnects the battery 92 and electrical conductor 122. Electrical conductor 129 operatively interconnects electrical conductor 123 and the second mercury switch 94. Electrical conductor 130 operatively interconnects signal light 76 and electrical conductor 122. It will be understood that the electrical conductors of the electrical circuit connected to the signal light extend through the tube 75 to and from the signal light.

The switch 91 has a switch lever assembly 135 diagrammatically illustrated in FIG. 3 interconnecting electrical conductors 124 and 125 and positionable to move the conductors 124 and 125 from the second or off position shown in FIG. 3 to the left to the first position or to the right to the third position. In the first position, electrical conductor 125 engages electrical contact 110 and electrical conductor 124 engages electrical contact 108. In the third position, electrical conductor 125 engages electrical contact 109 and electrical conductor 124 engages electrical contact 107.

OPERATION

The operation of the described embodiment of the subject invention is believed to be clearly apparent and is briefly summarized at this point. Referring more particularly to FIG. 1, the fishing apparatus 10 where to be used for ice fishing is assembled and placed in the attitude shown in FIG. 1 resting on the ice 12 over the hole 13 formed therein. When so positioned, the tubular housing 20 is disposed in a substantially vertical attitude rested on the legs 26 and with the reel 35 disposed substantially vertically above the hole. The operator extends the fishing line 40, bearing the hook and bait, not shown, into the water 14 through the hole in the ice as shown.

In the meantime, the indicating device 11 is disposed in the ready position or attitude shown in FIG. 1. In such position, the housing 60 and rod 65 are pivoted about pivotal connection 67 to a position approximately right angularly related to the support 66 mounted on the closure 45 in upstanding relation by slidable receipt of the remote end portion 70 thereof in the hole 49 of the closure. Since the end portion is slidable within the hole 49, it can be pivoted therewithin to position the indicating assembly in the position, in a horizontal plane, desired. The release member 80 is extended to position the ring 83 thereof about the protrusion 37 and within the notch 36 of the reel 35 to retain the indicating device in the ready position. At this time, the fishing line 40 does not have sufficient weight to rotate the reel 35 and so the reel is retained in whatever position the operator so disposes it. Accordingly, the protrusion 37 of the reel offers sufficient resistance to retain the indicating device 11 in the ready position shown in FIG. 1.

Depending upon the environmental conditions at the time, the operator can select the signals most appropriate. The signal member 78 can slidably be moved along the tube 75 and disposed within the enclosure 77 so that it is not visible. The switch lever assembly 135 of the switch 91 can be moved from the second or "off" position to either of the two "on" positions. If the switch lever assembly is moved to the third position or "on" position on the right as viewed in FIG. 3, current is transferred through the electrical circuit 105 from the battery 92 to light the light emitting diode 97. The light emitting diode thus indicates that upon gravitational movement of the indicating device 11 to the signaling or indicating position shown in FIG. 2, the mercury switch 94 will close causing the signal light 76 to be illuminated. However, until the mercury switch 94 is closed by such movement, the signal light 76 will not be illuminated.

Alternatively, if the switch lever assembly 135 is moved to the first position or "on" position on the left as viewed in FIG. 3, the electrical circuit 105 is also closed through the light emitting diode 97 and to mercury switch 94 so that the light 76 will be lighted upon movement of the indicating assembly to the indicating position. In addition, however, the portion of the circuit connecting with the signal horn 90 is placed in a condition such that upon movement of the indicating assembly to the indicating position, the mercury switch 93 will also close causing the signal horn to sound. Therefore, when the switch lever assembly is in the first position, movement of the indicating assembly to the indicating position will cause both the light to be illuminated and the horn to sound.

The light emitting diode 97 thus serves the function at night, when the lever assembly 135 is in either of the "on" positions so as to illuminate the light emitting diode, of revealing the location of the fishing apparatus. This is particularly important where, as is often the case in ice fishing, the operator has several fishing devices in use at the same time during non-daylight hours.

The operator is thus provided with several options in choosing the signal or signals to be effectuated upon a fish striking the fishing line 40. Among the options described is to leave the switch lever assembly in the "off" position and simply rely upon observation of the movement of the indicating assembly from the ready position to the indicating position as further evidenced by gravitational movement of the signal member 78 from within the enclosure 77 along the rod 75 to the stop ring 79.

Once the signal selections have been made, the operator simply awaits the striking of the fishing line by a fish to cause the reel 35 to be rotated about the spindle 34 thereby pulling the protrusion 37 from the ring 83 and releasing the rod 75 and thus the indicating assembly for movement from the ready position to the indicating position.

Figure 5:
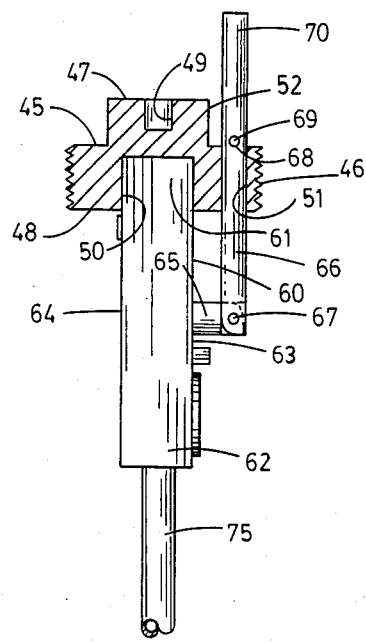
FIG. 5 is a somewhat enlarged, fragmentary longitudinal section taken on line 5—5 in FIG. 4.
Figure 4:
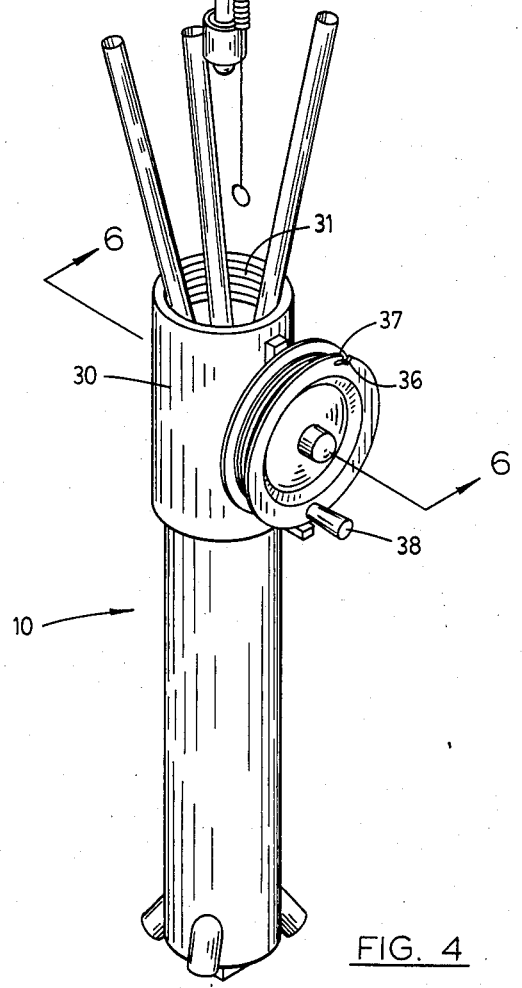
FIG. 4 is a perspective view showing the relative positions of the operative components of the fishing apparatus and indicating device positioned for disposition in a transport configuration.

Disassembly and storage of the fishing apparatus 10 and indicating device 11 can most easily be visualized upon reference to FIGS. 4 and 5. Disassembly is achieved by slidably removing the legs 26 from their individual sleeves 25. The remote end portion 70 of the support 66 is slidably removed from the hole 49 of the closure 45. The closure 45 is screw threadably removed from the mouth 30 of the tubular housing 20. The lower end portion 61 of the box-like housing 60 is then inserted in the second receptacle 50 of the closure at the same time the support 66 is slidably inserted through the lateral passage 51 of the closure, as can best be visualized in FIG. 5. Locking pin 69 is then inserted in the transverse hole 68 releasably to secure the indicating device on the closure 45 as shown in FIG. 5. Subsequently, the legs 26 and any other paraphernalia are deposited within the tubular housing 20 and the closure 45 is again screw threadably secured in the mouth 31 of the tubular housing so that the indicating device and legs are fully contained therewithin with the exception of the protruding end portion of the support. The fishing apparatus then can be carried much as a carrying case for the components thereof.

Therefore, the fishing apparatus and indicating device of the present invention provide for dependable operation cooperating in such a manner to protect the operative components thereof during transport and storage and providing the operator with the capability of choosing from among a variety of signals to indicate when a fish has contacted the fishing line.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A fishing apparatus comprising a tubular housing having an internal chamber and an open end portion facing upwardly when the housing is placed in an operative attitude; means for supporting the housing in the operative attitude; a reel for receiving a fishing line mounted on the housing for rotational movement about an axis of rotation which is substantially horizontal when the housing is in said operative attitude; a closure adapted for removably fitted receipt in the open end portion of the housing in closing relation to the chamber thereof to define a storage area; and an indicating device adapted to be mounted on the closure in said operative attitude for registering movement of the reel, the indicating device including a support adapted to be mounted on the closure in the operative attitude in an upstanding condition and an indicating assembly pivotally mounted on the support for movement between a ready position extending substantially horizontally above the reel and a substantially vertical indicating position and being so balanced as gravitationally to urge the indicating assembly to the indicating position and the indicating device further including a release member adapted to be mounted on the indicating assembly and releasably to be attached to the reel to retain the indicating assembly in the ready position.

2. The fishing apparatus of claim 1 wherein said closure has a first receptacle on one side thereof dimensioned to receive the indicating device in supported relation in said operative attitude, a second receptacle on the opposite side thereof dimensioned to receive the indicating assembly of the indicating device in a stored attitude, and a passage extending through the closure adapted to receive the support in a collapsed attitude to capture the indicating device within the chamber of the housing when said closure is in said fitted receipt in the open end portion of the housing.

3. The fishing apparatus of claim 2 wherein in said stored attitude a remote end portion of said support extends outwardly of the closure through the passage thereof and a fastener is adapted releasably to engage said remote end portion of the support to secure the indicating device on the closure in said stored attitude.

4. A fishing apparatus comprising a tubular housing having an internal chamber and an open end portion facing upwardly when the housing is placed in an operative attitude; means for supporting the housing in the operative attitude; a reel for receiving a fishing line mounted on the housing for rotational movement about an axis of rotation which is substantially horizontal when the housing is in said operative attitude; a closure adapted for removably fitted receipt in the open end portion of the housing in closing relation to the chamber thereof to define a storage area; and an indicating device adapted to be mounted on the closure in said operative attitude for registering movement of the reel, said closure having a first receptacle on one side thereof dimensional to receive the indicating device in supported relation in said operative attitude and a second receptacle on the opposite side thereof dimensioned to receive the indicating device in a stored attitude to capture the indicating device substantially within the chamber of the housing when said closure is in said fitted receipt in the open end portion of the housing.

5. An indicating device for registering a change in the condition of a work object such as a fishing apparatus or the like, the indicating device comprising a support adapted to be mounted in substantially fixed relation with respect to the work object; an indicating assembly mounted on the support for substantially pivotal movement between a substantially hourizontal ready position and a substantially vertical indicating position, the indicating assembly so weighted as gravitationally to urge the indicating assembly from the ready position to the indicating position; and a release assembly having removable means carried by the work object and interconnecting the indicating assembly when disposed in said ready position operable to retain the indicating assembly in said ready position and to release the indicating assembly from the ready position, upon said movement of the work object, for movement of the indicating assembly to the indicating position.

6. The indicating device of claim 5 wherein the indicating assembly has a track with a remote end portion, the track being substantially horizontal in the ready position and substantially vertical in the indicating position, an enclosure is borne by the remote end portion of the track and an indicating member is borne for slidable movement on the track between a concealed position within the enclosure and a position gravitationally displaced therefrom along the track.

7. The indicating device of claim 5 wherein the indicating assembly contains an electrical circuit operatively interconnecting a source of electrical energy, a mercury switch and an electrically operated signaling device, said electrical circuit, source, mercury switch and signaling device being so arranged that movement of the indicating assembly to the indicating position closes the mercury switch causing electrical energy to flow through the electrical circuit from the source to the signaling device.

8. The indicating device of claim 6 wherein the work object is the reel of an ice fishing device and the release assembly includes a cable assembly having an end portion attached to the track and an opposite end portion attached to the reel as to be released upon movement of the reel.

9. An indicating device adapted for use on an ice fishing device having a reel for fishing line rotationally mounted thereon, the indicating device comprising:

A. a support adapted releasably to be mounted on the ice fishing device in an operative attitude in upstanding relation;

B. an indicating assembly having a housing, mounted on the support for pivotal movement through a range of positions of approximately ninety degrees, and an arm mounted on the housing; and C. a release assembly having an end portion mounted on the arm of the indicating assembly and an opposite end portion adapted for releasable attachment to the reel of the ice fishing device in the operative attitude to retain said indicating assembly in a first pivotal position to indicate a ready condition and upon rotation of the reel to be released from the reel to allow the indicating assembly gravitationally to pivot to a second pivotal position to indicate contact by a fish with the fishing line.

10. The indicating device of claim 9 wherein an enclosure is affixed on the remote end portion of the arm and a signaling sleeve is borne on the arm for slidable movement from a position concealed within the enclosure to an exposed position gravitationally displaced from the enclosure along the arm.

11. The incicating device of claim 9 wherein said indicating assembly has an electrical system including a signal light mounted on the remote end portion of the arm; a battery; a horn and a pair of mercury switches mounted within the housing; a main control switch mounted on the housing; and an electrical circuit interconnecting the main control switch, battery, horn, pair of mercury switches and signal light whereby positioning of the main switch in a first operative position operatively interconnects the battery, one of the pair of mercury switches and horn so that said movement of the indicating assembly to the second pivotal position closes said one of said pair of mercury switches to sound the horn and positioning of the main switch in a second operative position operatively interconnects the battery, the other of said pair of mercury switches and signal light so that said movement of the indicating assembly to the second pivotal position closes said other of said pair of mercury switches to illuminate the signal light.

12. The indicating device of claim 11 wherein the electrical system includes a light emitting diode mounted on the housing in position to be visible externally thereof and the electrical circuit operatively interconnects the first operative position of the main switch, battery and light emitting diode whereby said light emitting diode is illuminated when the main switch is in the first operative position.

13. The indicating device of claim 11 wherein said electrical circuit operably interconnects the main control switch, battery, horn, pair of mercury switches and signal light whereby positioning of the main switch in the first operative position operatively interconnects the battery, both of said mercury switches, horn and signal light so that movement of the indicating assembly to the second pivotal position closes said pair of mercury switches to sound the horn and illuminate the signal light.

14. An indicating device for use with a fishing apparatus from which is extended a fishing line bearing bait for a fish, the indicating device comprising an indicating assembly having a track with a remote end portion, the track being substantially horizontal in the ready position and substantially vertical in the indicating position, an enclosure borne by the remote end portion of the track and an indicating member borne for slidable movement on the track between a concealed position within the enclosure and a position gravitationally displaced therefrom along the track;

means for mounting the indicating assembly for substantially pivotal movement between a ready position and an indicating position and for urging the indicating assembly under the force of gravity to the indicating position; and a release assembly mounted on the indicating assembly for retaining the indicating assembly in the ready position and, upon a fish striking the fishing line, operable to release the indicating assembly for gravitational movement to the indicating position.

15. The indicating device of claim 14 in which the fishing apparatus has a reel from which said fishing line is extended and wherein the release assembly is adapted releasably to be attached to the reel to retain the indicating assembly in the ready position and releasable therefrom upon movement of the reel in response to pulling movement on the fishing line.

16. The indicating device of claim 14 wherein the indicating assembly contains an electrical circuit operatively interconnecting a source of electrical energy, a mercury switch and an electrically operated signaling device, said electrical circuit, source, mercury switch and signaling device being so arranged that movement of the indicating assembly to the indicating position closes the mercury switch causing electrical energy to flow through the electrical circuit from the source to the signaling device.

17. A fishing apparatus comprising a housing having an internal chamber;

means for supporting the housing in an operative attitude;

a reel for receiving a fishing line, said reel mounted on the housing for rotational movement;

a closure removably on the housing in closing relation to the chamber thereof to define a storage area;

an indicating assembly mounted on the closure for substantially pivotal movement between a ready position and an indicating position, said indicating assembly being so balanced as to be gravitationally urged to the indicating position when not retained in a ready position; and means for releasably attaching the indicating assembly to the reel to retain the indicating assembly in a ready position.

18. The fishing apparatus of claim 17 wherein the means for supporting the apparatus includes a pair of legs adapted removably to be mounted on and in supporting relation to the housing and wherein each leg of the pair is dimensioned to be received in the chamber in a stored condition.

* * * * *

UNITED STATES PATENT AND TRADEMARK OFFICE
CERTIFICATE OF CORRECTION

PATENT NO. : 4,616,437

DATED : October 14, 1986

INVENTOR(S) : Marvin R. Harvey

It is certified that error appears in the above-identified patent and that said Letters Patent is hereby corrected as shown below:

Column 3, line 58, between "port" and "remote" insert ---66---.

Column 9, line 9, delete "incicating" and substitute

---indicating---.

Signed and Sealed this

Twenty-third Day of December, 1986

Attest:

DONALD J. QUIGG

*Attesting Officer*   *Commissioner of Patents and Trademarks*